(No Model.)

K. GERSON.
SHIP FOR BATHING PURPOSES.

No. 431,226.            Patented July 1, 1890.

Witnesses:
Gustave Albert Oelrichs
G. Adolf Hardt.

Inventor:
Karl Gerson
per   _____
     Attorney.

UNITED STATES PATENT OFFICE.

KARL GERSON, OF HAMM, GERMANY.

SHIP FOR BATHING PURPOSES.

SPECIFICATION forming part of Letters Patent No. 431,226, dated July 1, 1890.

Application filed December 15, 1888. Serial No. 293,766. (No model.)

*To all whom it may concern:*

Be it known that I, KARL GERSON, of Hamm, in Westphalia, Germany, have invented a new and useful Improvement in Ships for Bathing Purposes, of which the following is a specification.

A ship requires for its propulsion a certain force, which is proportionate to the resistances which are opposed to its motion. Persons who in a bathing apparatus secured to the ship are exposed to the action of the water will oppose to the water a passive resistance, because the said persons are carried along by the force of the ship without being active themselves. In consequence of this passive resistance a pressure is exerted upon the human body, which pressure is converted in the body into heat. The said pressure can be increased or decreased, according to the speed of the ship. The whole result is therefore as follows: production of heat in the human body while the said body is at rest during bathing. The action of the process based upon this principle is considerably increased by the fact that at the same time artificially-produced waves act upon the human body. This is obtained simply by adopting the above-mentioned apparatus (irrespective of the usual vicinity of the ship) close behind the two paddle-wheels of a steamer. The waves which are thereby produced artificially and which are constantly uniform are refreshing to the bathing persons in consequence of the effervescence arising from the mixture of water with air and enhance the action of the bath.

Figure 1:
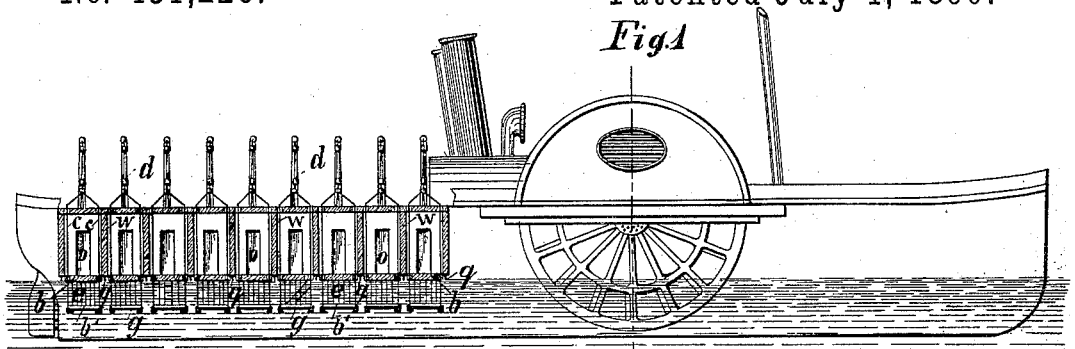
Figure 2:
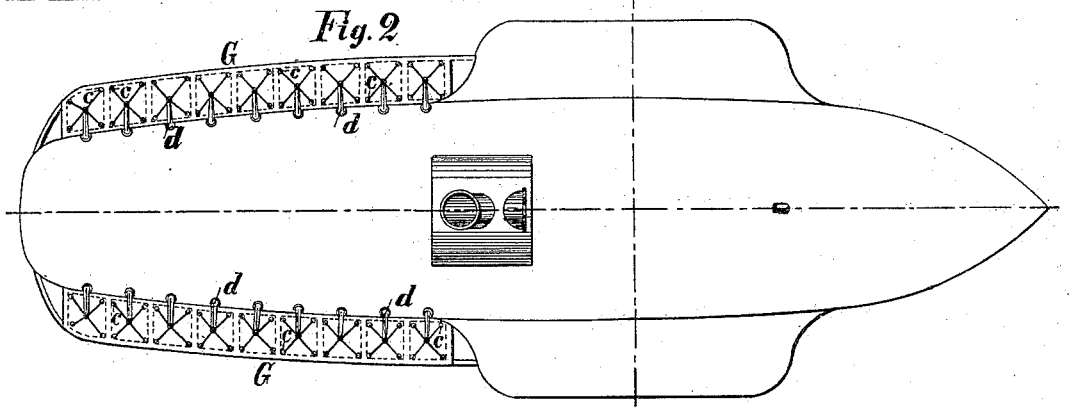
Figure 3:
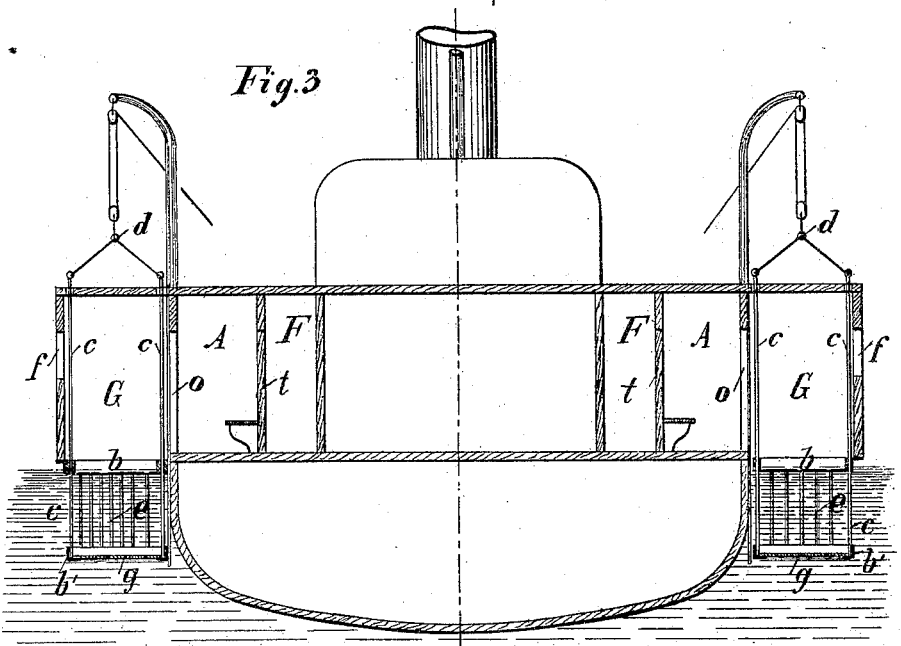

In the annexed drawings, Figure 1 is a longitudinal elevation of a paddle-steamer fitted with my bathing apparatus, the latter being in section. Fig. 2 is a top view. Fig. 3 is a cross-section on a larger scale.

To both longitudinal sides of the steamer, including the passage over the paddles, is fitted a gallery G, which is connected with the body of the ship by means of longitudinal and cross bars, so as to form part of the ship. As shown in the drawings, the gallery G is closed outwardly as well as at the top, and is only provided with windows $f$ and doorways $o$, by which latter a communication is established with the dressing-chambers A.

Lengthwise the gallery G is divided by means of partitions $w$, resting upon cross-bars $q$, into different compartments, each of which is connected to a separate dressing-room A by a doorway $o$. Each doorway $o$ communicates with a passage F by means of a door $t$, giving access to the bathing compartments or cells. The fixed upper part of each bathing-cell is provided at the bottom with a pan or basket made of iron and wood. Each basket is so formed as to allow free passage of the water, and is so suspended or secured that it can be made to enter more or less deeply into the water. The upper and lower frames $b$ and $b'$, which are made of any suitable material, are connected by means of four rods $c\ c$ to a hoist $d$, which can be worked from the deck. Moreover, both frames $b\ b'$ are held at a suitable distance apart by means of rods $e\ e$. Onto the lower frame $b'$ is a bottom $g$, made of lattice-work, the meshes of the lattice being a suitable distance apart, so as not to offer too great a resistance when lowering or raising the basket into or out of the water. The rods $c$ pass through openings made in the roof of the bathing-cell and are connected to any suitable hoisting apparatus. For facilitating the raising and lowering of the basket, the frames can be guided by flat rails or by any other suitable contrivance.

The bather is admitted to the bathing-cell either by a staircase, a ladder, or such like. In each cell may be fitted suitable seats, handles, or other like accommodations.

Instead of forming the galleries quite closed the same can also be open at the outer sides and at the top. In such case the necessary safety appliances would require to be fitted, and the arrangement would generally require to be such that the gallery can be closed by cloth or other suitable material.

In the annexed drawings the gallery is only applied at the rear part of the ship—*i. e.*, behind the paddle-box; but it is evident that the bathing-cells can be fastened to the sides at the front part—*i. e.*, in advance of the paddle-box.

Likewise, several bathing-cells can be fitted alongside of each other lengthwise of the ship. The cells situated in a line and close to each other can then communicate with the dressing-room by a doorway o, common to all cells.

Instead of subdividing the gallery into several cells by means of partition-walls, the gallery might also form one single bathing-chamber, the lower part of which might as a whole be raised or lowered at will.

If it be considered that in accordance with the Archimedean principle a body dipped into water loses as much of its weight as will correspond to the weight of the quantity of water which it displaces, it will be readily seen that the ship would not be considerably loaded by the apparatus fixed thereto.

A paddle-steamer fitted with a bathing apparatus of the kind hereinbefore described can well be called a "bathing-ship," since, with the exception of excursions in summer, it is only used for bathing purposes, and in consequence thereof it undergoes changes as well on deck as inside. The said ship can be used on large rivers and also at sea, even if only at a short distance from the coast—say one hundred and fifty meters.

The hereinbefore-described apparatus can also be applied to other classes of steamers.

Having fully described my invention, what I claim is—

In paddle-steamers and other classes of steamers, the combination, with the galleries G on the sides of the steamers, the dressing-chambers A, the passages F, the bathing-cells composed of the upper and lower frames $b\ b'$, the rods $c$ and rods $e$, and the hoists $d$, substantially as and for the purposes herein described.

In testimony whereof I have signed this specification in the presence of two subscribing witnesses.

KARL GERSON.

Witnesses:
GUSTAVE ALBERT OELRICHS,
G. ADOLF HARDT.